(12) United States Patent
Reimers et al.

(10) Patent No.: US 6,698,789 B2
(45) Date of Patent: Mar. 2, 2004

(54) COLLAPSIBLE GOLF CART

(75) Inventors: Eric W. Reimers, Missoula, MT (US); Mark Robirds, Potomac, MT (US)

(73) Assignee: Sun Mountain Sports, Inc., Missoula, MT (US)

( * ) Notice: Subject to any disclaimer, the term of this patent is extended or adjusted under 35 U.S.C. 154(b) by 0 days.

(21) Appl. No.: 09/776,041

(22) Filed: Feb. 1, 2001

(65) Prior Publication Data

US 2001/0033070 A1 Oct. 25, 2001

Related U.S. Application Data

(60) Provisional application No. 60/180,170, filed on Feb. 4, 2000.

(51) Int. Cl.[7] .................................................. B62B 1/00
(52) U.S. Cl. .................................. 280/651; 280/DIG. 6; 280/654
(58) Field of Search ................................ 280/651, 652, 280/655, 645, 646, 47.17, 47.26, 47.315, DIG. 6, DIG. 5, 642, 647, 654, 639; 248/96, 98, 95, 97

(56) References Cited

U.S. PATENT DOCUMENTS

| | | | |
|---|---|---|---|
| 2,647,762 A | 8/1953 | Jamieson et al. | 280/41 |
| 2,687,894 A | 8/1954 | Stoddard | 280/41 |
| 2,936,182 A | 5/1960 | Williamson | 280/41 |
| 3,191,957 A | 6/1965 | Meiklejohn | 280/41 |
| 3,265,402 A | 8/1966 | Snyder | 280/41 |
| 3,400,943 A | 9/1968 | Meiklejohn | 280/41 |
| 4,289,326 A | 9/1981 | Hawkes | 280/646 |
| 4,337,960 A | 7/1982 | Stewart | 280/47.37 |
| 4,522,299 A | 6/1985 | Clark et al. | 206/315.3 |
| 4,657,100 A | 4/1987 | Lewis | 180/19.1 |
| 4,890,856 A | 1/1990 | Mursch et al. | 280/646 |
| 5,048,856 A | 9/1991 | Sanders et al. | 280/646 |
| 5,161,635 A | 11/1992 | Kiffe | 180/193 |
| 5,167,389 A | 12/1992 | Reimers | 248/96 |
| 5,180,023 A | 1/1993 | Reimers | 180/19.1 |
| 5,281,044 A | 1/1994 | Chen | 403/328 |
| D362,103 S | 9/1995 | Schnoll | D34/15 |
| 6,050,592 A | 4/2000 | Kim | 280/652 |
| 6,099,020 A | 8/2000 | Liao | 280/643 |
| 6,120,053 A | 9/2000 | DeAngelis | 280/641 |
| 6,126,184 A | 10/2000 | Liao | 280/47.371 |
| 6,131,917 A | 10/2000 | Walsh | 280/DIG. 6 |
| 6,168,174 B1 | 1/2001 | MacDougall | 280/47.34 |
| 6,220,611 B1 | 4/2001 | Shapiro | 280/47.34 |
| 6,296,260 B1 | 10/2001 | Schiavone | 280/47.2 |
| 6,464,243 B2 | 10/2002 | Roche | 280/650 |

FOREIGN PATENT DOCUMENTS

| | | |
|---|---|---|
| FR | 2 682 923 A1 | 10/1991 |
| TW | 356026 | 2/2000 |

*Primary Examiner*—Brian L. Johnson
*Assistant Examiner*—Hau Phan
(74) *Attorney, Agent, or Firm*—Larry B. Guernsey; IPLO Intelelctual Property Law Offices

(57) ABSTRACT

A golf bag cart (10) having a frame (14), a handle (22), first and second rear wheels (18, 20), and first and second wheel struts (52, 54), to which the first and second rear wheels (18, 20) are rotatably mounted, the first and second wheel struts (52, 54) being pivotally mounted to the frame (14) by mid-frame pivots (68). A front wheel (16) and a front wheel mount (44) are included, the front wheel mount (44) being pivotally attached to the frame (14) by a lower frame pivot (40). The golf bag cart (10) is movable from an extended configuration (12) to a collapsed configuration (13), such that the rear wheels (18, 20) pivot about the mid-frame pivots (68) to move towards the front wheel (14). The front wheel (14) and the wheel mount (44) pivot about the lower frame pivot (40) so that the front wheel (16) moves towards the rear wheels (18, 20), as the golf bag cart (10) is being collapsed.

18 Claims, 15 Drawing Sheets

COLLAPSIBLE GOLF CART

This application claims priority from U.S. Provisional Application Ser. No. 60/180,170, filed Feb. 4, 2000, which has the same inventors as the present application.

TECHNICAL FIELD

The present invention relates generally to carts used in transporting sports equipment, and more particularly to golf carts.

BACKGROUND ART

Golf is a sport which its practitioners often take very seriously. In particular, golfers may have a large selection of clubs to use for every foreseeable occasion, and consequently, the golf bag and its collection of clubs may become heavy and cumbersome to carry around the golf course. One answer to this problem has been the golf cart, to which the bag can be strapped, thus relieving the golfer of the burden of carrying his collection of clubs upon his shoulders.

A golf cart ideally has several qualities which make it well suited for its purpose. One such quality is stability, since the cart will be expected to be driven over rough terrain, possibly in varying weather conditions. To aid in stability, it is thus desirable that the cart have tires and wheels of a sufficient diameter that the wheels do not become stuck in small ruts and mud puddles. The cart should have a sufficiently wide wheel base that it does not easily tip over when on sloped terrain, or when buffeted by winds. It must additionally be large enough in its frame that a fair sized golf bag can be easily secured to it, usually at top and bottom, thus implying a certain minimum length between the wheels and the upper handle.

All of these features which add to the cart's stability do so by establishing a certain breadth and length to the cart. Unfortunately, these same breadth and length requirements also serve to make the cart bulky, and less easily portable than may be desirable. One partial solution to the bulk of these golf carts has been to make them somewhat foldable in some part or parts. However, the compactness of a golf cart is still generally limited by the same features, namely wheel diameter, and frame length, which lend stability.

Another fairly recent trend in golf carts is for carts that are pushed ahead of the user rather than being pulled behind. The traditional "pull behind" cart was a two-wheeled structure with a support foot acting as a third support for parking the cart. The foot was lifted from engagement with the ground by tilting the cart backwards so the support foot left the ground, and then rolled on the two wheels. This "pull behind" style had certain ergonomic disadvantages, compared to a push style cart, particularly because the user had to being continually reaching behind himself to hold the handle, which twisted the user's body, and could potentially aggravate back problems, muscle strains, etc. Additionally, the user is less able to watch for obstructions in the cart's path, since it is being pulled behind, while the user is presumably watching the terrain ahead of him. A pushcart can often propel itself down a slope or on hard ground. A pull cart requires constant attention and effort. Our arms are not designed to pull an object or otherwise work behind us. Usually, when performing any task that requires such an effort, we would turn around and face the task. This could be dangerous on the golf course with a pull cart (i.e. ponds, cliffs, snakes, etc.) Additionally, pushing a cart allows the golfer to stand directly on the extended centerline of the cart, maximizing his energy expenditure.

There is thus still a great need for a golf cart which can collapse or fold so that its various components can be reconfigured into a very compact structure, but without disassembling its components, and thus can be quickly moved from a collapsed configuration to an extended one with a minimum of effort.

DISCLOSURE OF INVENTION

Accordingly, it is an object of the present invention to provide a cart which collapses to a compact configuration.

Another object of the invention is to provide a cart which has a long wheel base for stability.

And another object of the invention is to provide a cart which has large diameter wheels for easy navigation over terrain.

A further object of the present invention is to provide a cart which is pushed rather than pulled.

Yet another object of the present invention is to provide a cart with a handle which is ergonomically designed for comfort.

An additional object of the present invention is provide a collapsible cart which moves quickly and easily between its extended and collapsed configurations.

Briefly, one preferred embodiment of the present invention is a golf bag cart having a frame, a handle, first and second rear wheels, and first and second wheel struts, to which the first and second rear wheels are rotatably mounted, the first and second wheel struts being pivotally mounted to the frame by mid-frame pivots. A front wheel and a front wheel mount are included, the front wheel mount being pivotally attached to the frame by a lower frame pivot. The golf bag cart is movable from a extended configuration to a collapsed configuration, such that the rear wheels pivot about the mid-frame pivots to move towards the front wheel. The front wheel and the wheel mount pivot about the lower frame pivot so that the front wheel moves towards the rear wheels, as golf bag cart is being collapsed.

An advantage of the present invention is it provides a very wide and stable wheel base when in extended configuration.

Another advantage of the invention is it quickly and easily collapses into a compact shape for storage or transportation.

And another advantage of the invention is that it is designed to be pushed rather than pulled, and has (comparatively) large diameter wheels, thus requiring less energy to move and maneuver.

A further advantage of the invention is that being a three-wheeled cart rather than a two-wheeled cart, it can stand upright without further support; therefore no effort is required to balance the cart.

An additional advantage is that on level or downgrade hills, the present invention can travel unaided for 10 to 50 yards, thus minimizing effort.

Yet another advantage of the invention is that the cart will stand erect when folded so it can be stored in the bagroom or garage compactly.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
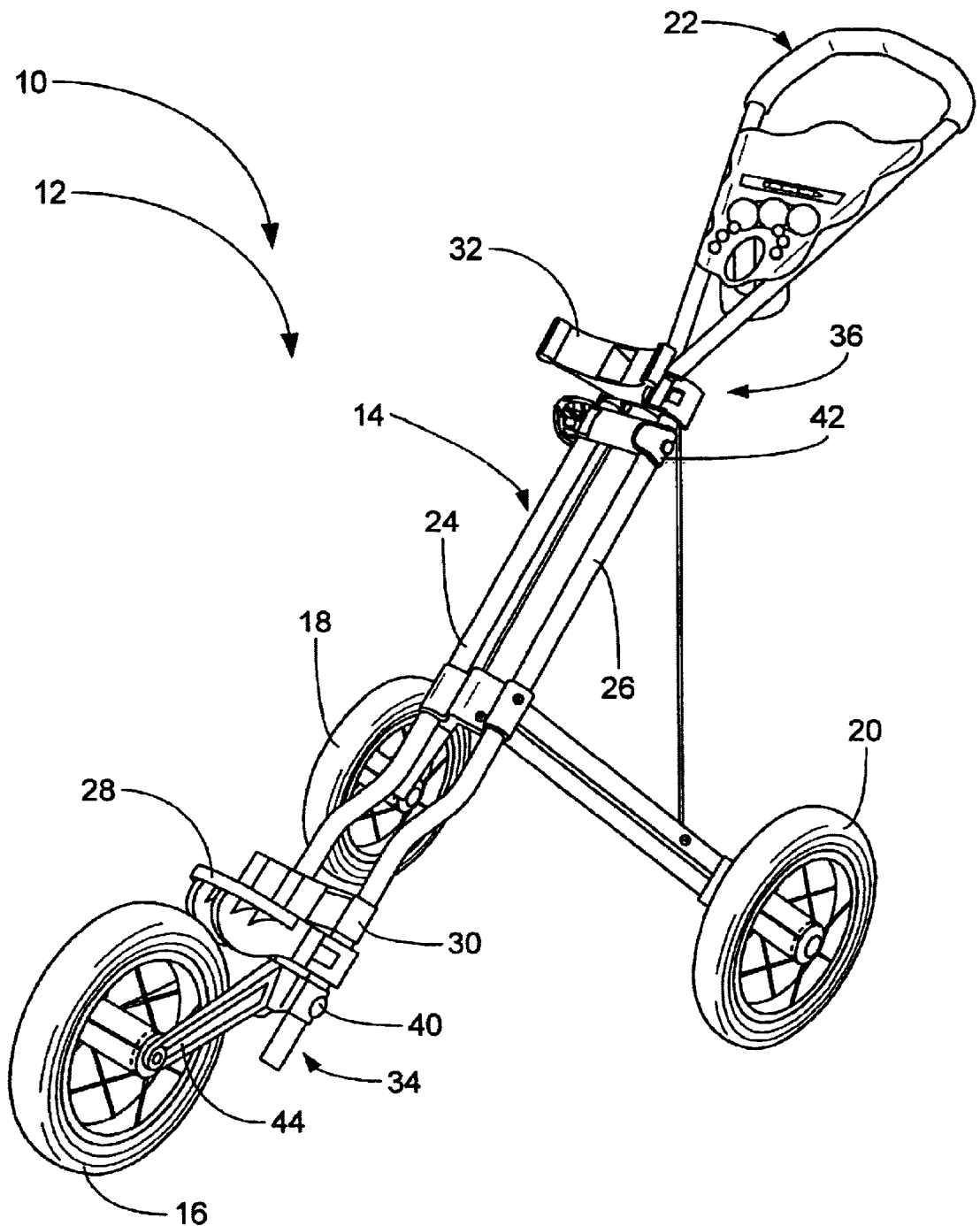
FIG. 1 shows a front perspective view of the folding golf cart in extended position.

A preferred embodiment of the present invention is a collapsible or folding golf cart. As illustrated in the various drawings herein, and particularly in the view of FIG. 1, a form of this preferred embodiment of the inventive device is depicted by the general reference character 10.

FIG. 1 illustrates the folding golf cart 10 which is shown in the extended position 12. The folding golf cart 10 includes a frame 14, a front wheel 16, a left rear wheel 18, a right rear wheel 20, and a handle 22. The frame 14 preferably includes a left frame member 24 and a right frame member 26, but again this is not a necessity, and it is possible that a single central frame member may be used. At the lower end 34 of the frame 14 there is a lower bag support 28, and a lower bag wrap 30. The upper end 36 of the frame 14 has an upper bag wrap 32. The lower end of the frame 34 also has a lower frame pivot 40 around which the front wheel 16 and its associated front wheel mount 44 can rotate. The upper end of the frame 36 has an upper frame pivot 42 about which the handle 22 can pivot.

The cart 10 is configured as a push cart, although its features of compactness and ease of assembly/disassembly may be applied to a pull cart as well, and, indeed if a user cared to, the cart 10 could easily be pulled as well, with no modifications.

Figure 2:
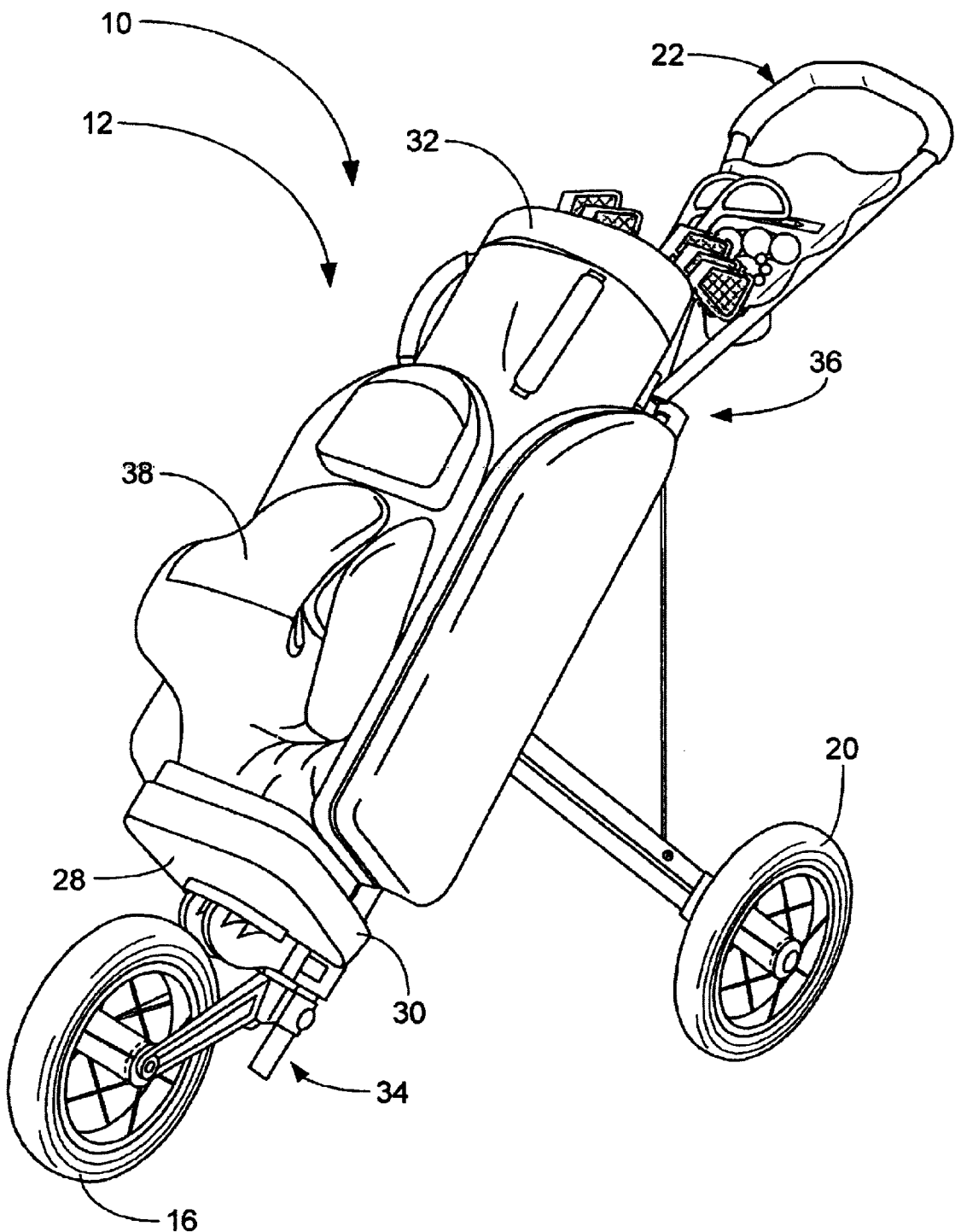
FIG. 2 shows a front perspective view of the folding golf cart in extended position with a golf bag attached.
Figure 3:
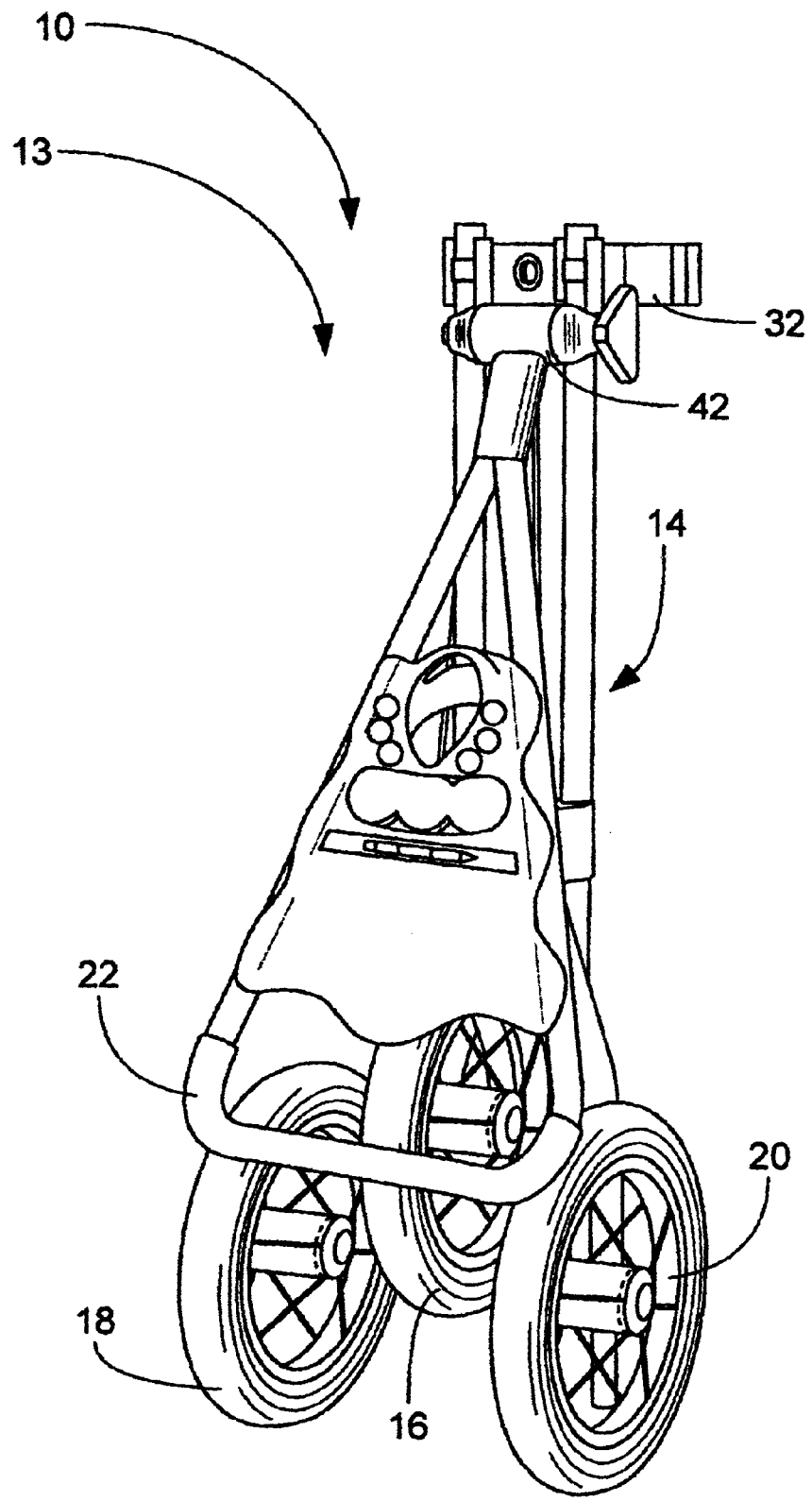
FIG. 3 shows a front perspective view of the folding golf cart in retracted position.

FIG. 2 shows a bag 38 which is mounted on the folding cart 10, showing how the foot of the bag rests on the lower bag support 28, and the lower bag wrap 30 engages it, while the upper end of the bag is held by the upper bag wrap 32.

FIG. 3 and FIGS. 9–11 show a folding golf cart 10 in retracted position 13, in which the front wheel 16 and its front wheel mount 44 have been rotated at the lower frame pivot 40, so that it is between the rear wheels 18, 20 and aligned roughly vertically with them. The handle 22 has been rotated about the upper frame pivot 42 so that it folds down to meet the wheels 16, 18, 20. The cart is thus reduced to a very compact shape which can easily be carried and placed in an automobile trunk, or boxed for shipment.

Figure 4:
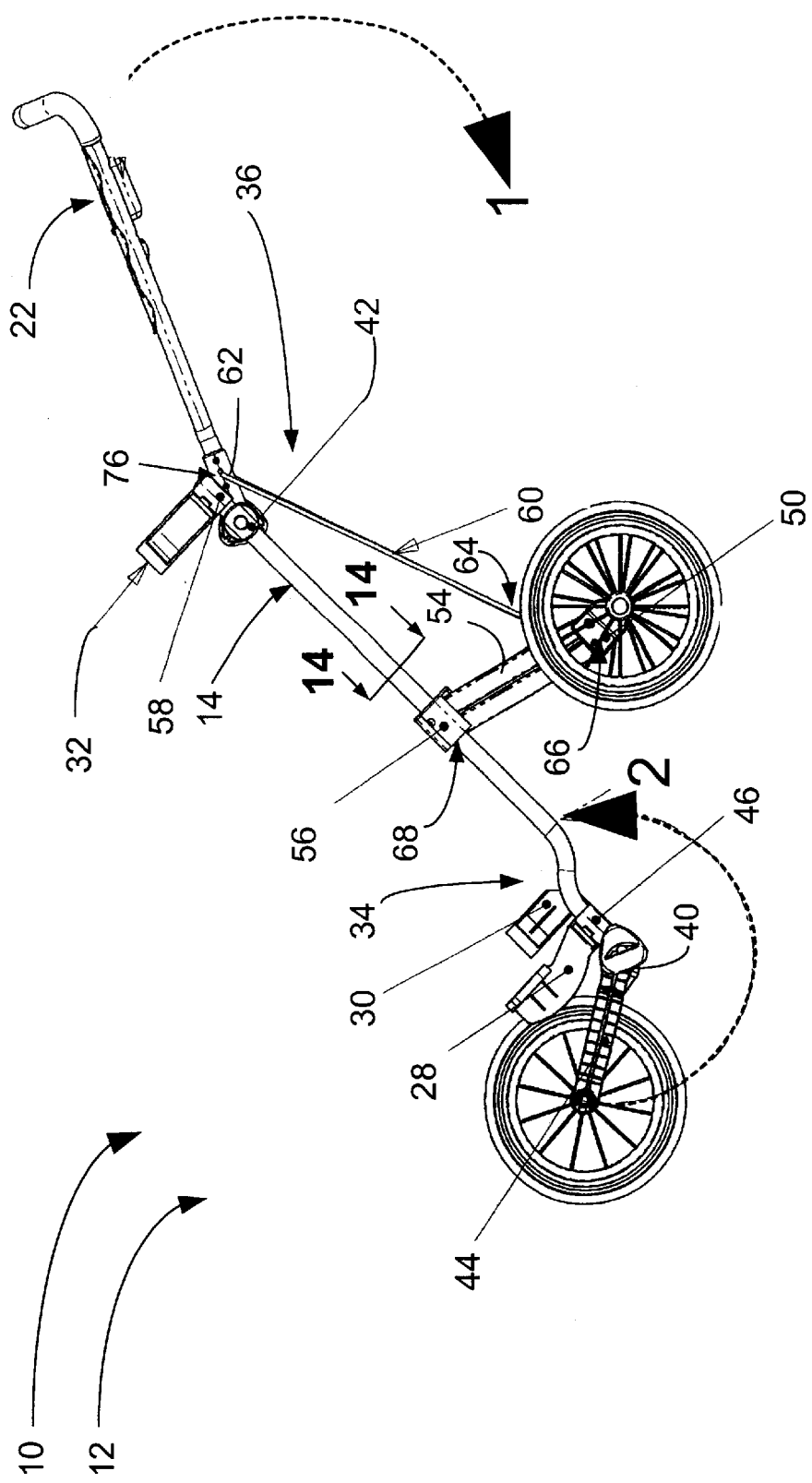
FIG. 4 illustrates a side plan view of the folding golf cart in extended position.

FIG. 4 illustrates a side view of the folding cart 10 again in extended position 12. The front wheel mount 44 which holds the front wheel 16 can be seen, as well as the support mount 46. The right rear wheel strut 54 is attached at a wheel fitting pivot 66 to the right wheel fitting 50 and to the middle fitting 56 at a mid frame pivot 68, the middle fitting 56 being attached to the frame 14. The upper frame end 36 includes a support mount 58 to which upper end 62 of a link rod 60 is pivotally attached, the lower end 64 of the link rod 60 being pivotally attached to the wheel strut 54. When the folding cart 10 is to be collapsed from the extended position 12 to the retracted position 13, the handle 22 rotates about the upper frame pivot 42 in a clockwise direction as shown by the arrow 1. This causes the upper end 62 of the link rod 60 to move towards the lower end of the frame 34, pushing the wheel struts 52, 54 and attached wheel fittings 48 and 50 also towards the lower end of the frame 34, and also drawing the left rear wheel 18 and the right rear wheel 20 towards each other. The wheel base dimension in extended position is preferably 24 inches which goes to 13 inches in the retracted position. Of course these dimensions are not to be construed as limitations, and are recited for illustration only.

The handle 22 extends the wheels 18, 20, but the rotation of the handle 22 can be stopped within a 10 inch adjustment range without adversely affecting wheel width. The handle 22 is also adjustable to fit at the most efficient ergonomically correct angle. This has two components, the elevation of the adjusted handle 22, and the angled portion of the handle 22 that is held in hand.

In retracting the folding cart 10, the front wheel 16 moves in a counter-clockwise direction about lower frame pivot 40 as indicated by arrow 2. In practice, it is preferred that the front wheel 16 be retracted first, before the handle 22 is rotated to retracted position, but this is not to be construed as a limitation.

Figure 5:
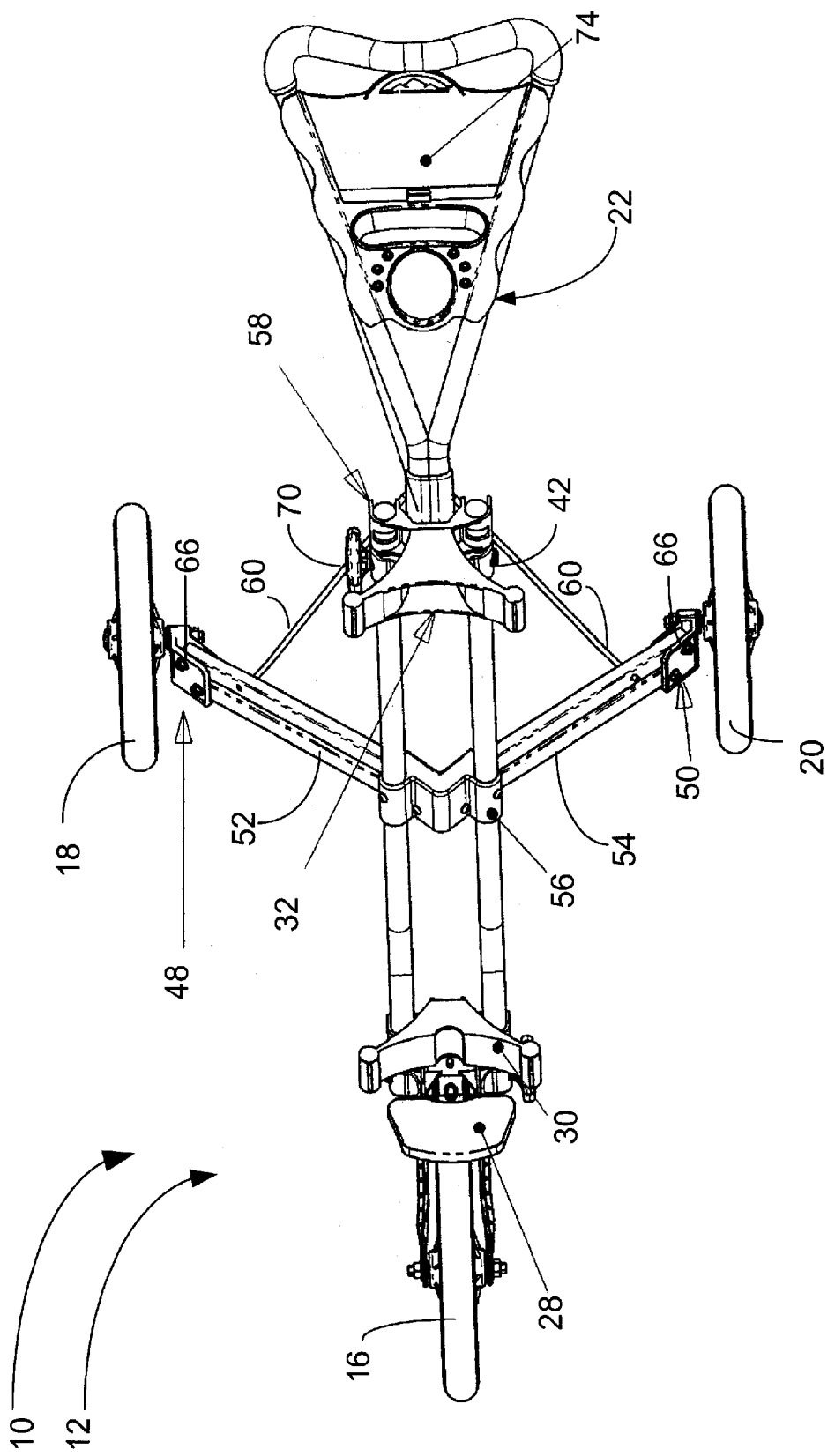
FIG. 5 illustrates a top plan view of the folding golf cart in extended position.

FIG. 5 is a top plan view of the folding golf cart 10, which is also in extended position 12. Again are shown the front wheel 16, left rear wheel 18, right rear wheel 20, handle 22, lower bag support 28, lower bag wrap 30 and upper bag wrap 32. The left wheel fitting 48, right wheel fitting 50, middle fitting 56, left wheel strut 52 and right wheel strut 54, as well as upper frame pivot 42, upper support mount 58, and link rods 60 are also seen, as well as the wheel fitting pivots 66. An upper locking knob 70 can be seen which, when engaged, prevents the handle 22 from rotating. There is a similar lower locking knob 72, not visible in this view which serves a similar purpose for locking the front wheel 16 from rotation. An accessories tray 74 is visible as a part of the handle 22.

Figure 6:
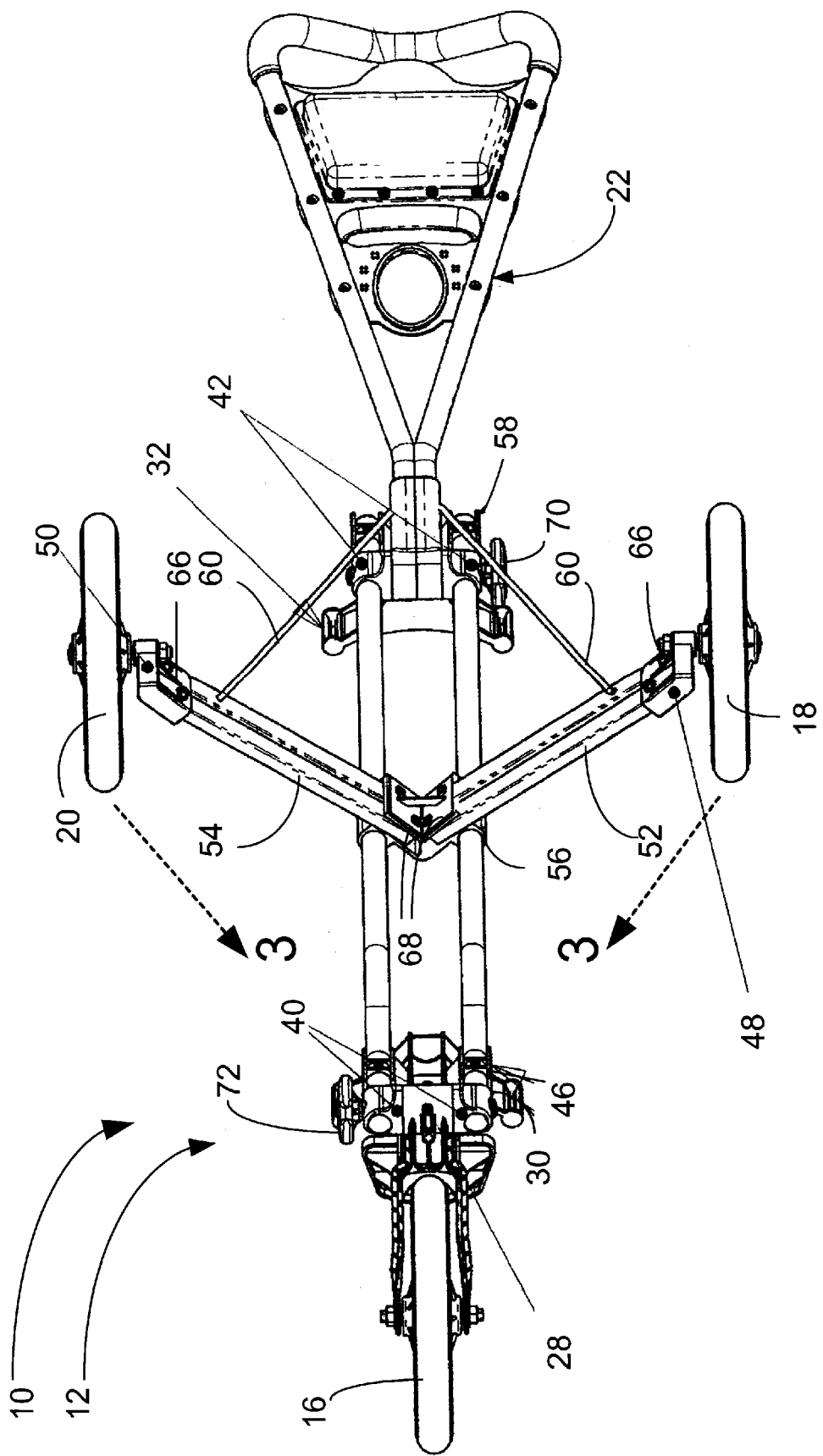
FIG. 6 shows a bottom plan view of the folding golf cart in extended position.

FIG. 6 is a bottom plan view of the folding golf cart 10, which is also in extended position 12. Again are shown the front wheel 16, left rear wheel 18, right rear wheel 20, handle 22, lower bag support 28, lower bag wrap 30 and upper bag wrap 32. The left wheel fitting 48, right wheel fitting 50, middle fitting 56, left wheel strut 52 and right wheel strut 54, as well as upper frame pivot 42, upper support mount 58, and link rods 60 are also seen, as well as the wheel fitting pivots 66. A lower locking knob 72 can be seen which, when engaged, prevents the handle 22 from rotating. The upper locking knob 70 is also seen in this view. The lower frame pivot 40, lower support mount 46, and mid frame pivots 68 are visible. The left and right rear wheels 18, 20 will follow roughly the path taken by the arrows 3, when the folding golf cart 10 is collapsed from the extended position to the retracted position.

Figure 7:
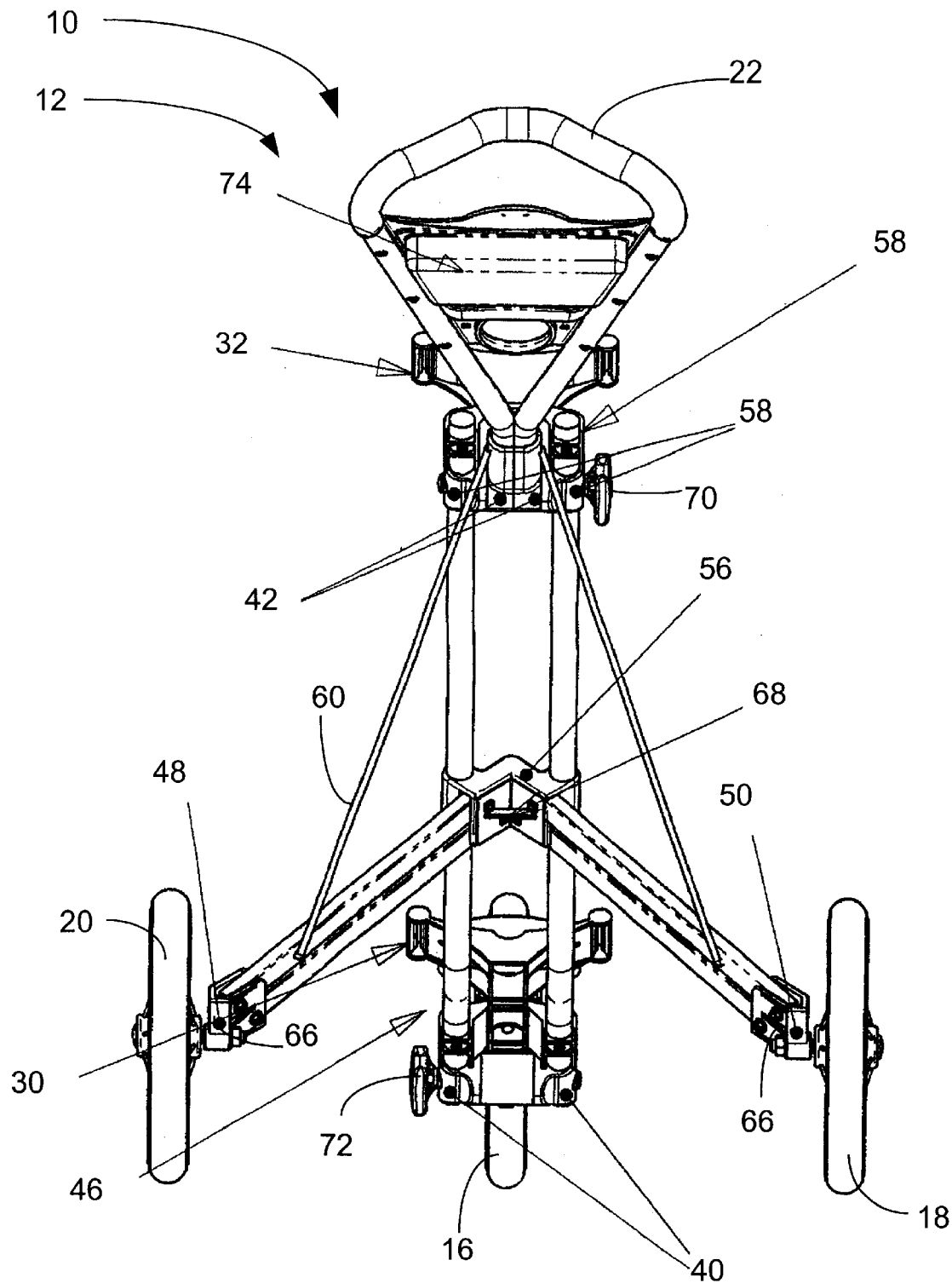
FIG. 7 illustrates a rear plan view of the folding golf cart in extended position.
Figure 8:
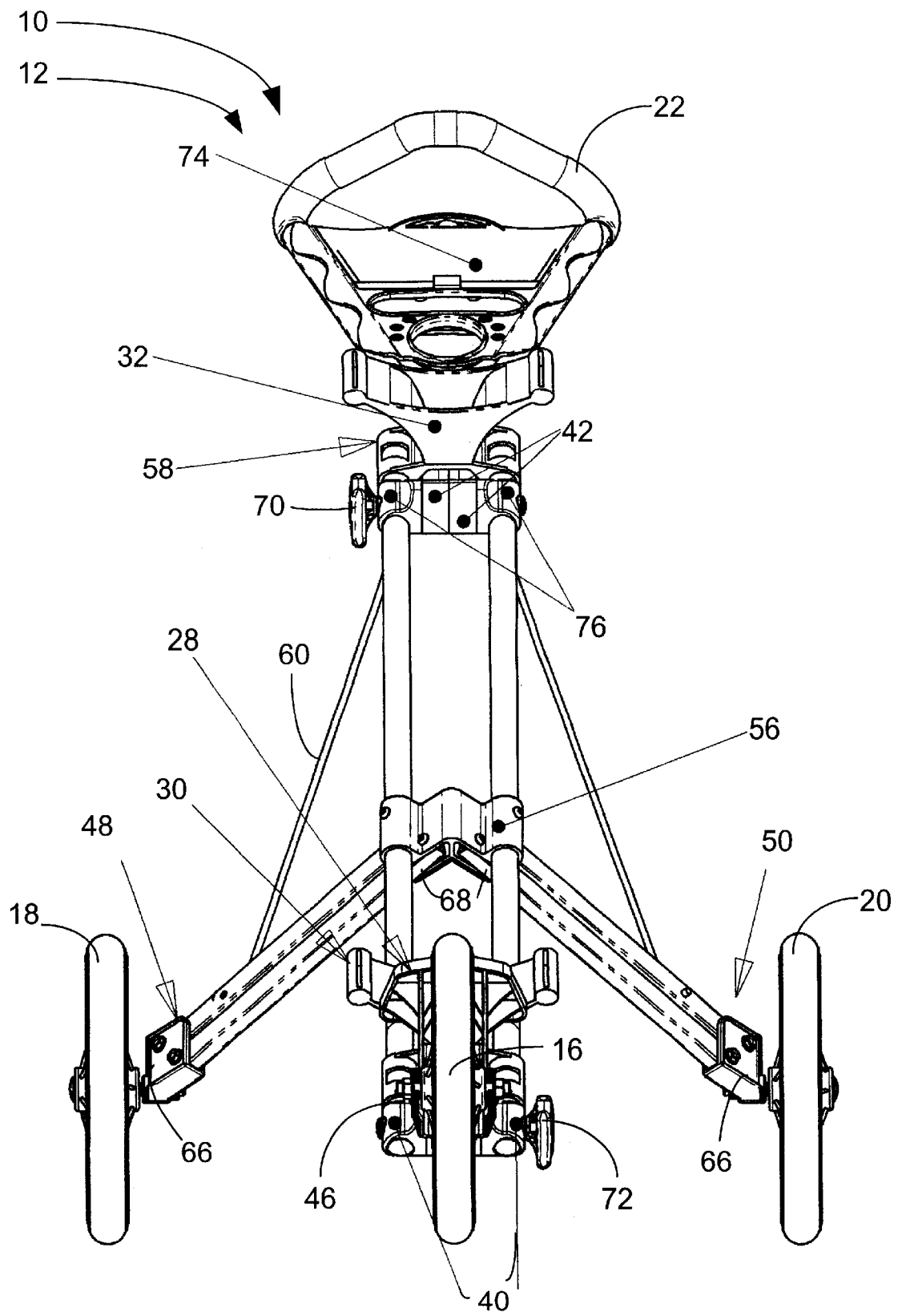
FIG. 8 shows a front plan view of the folding golf cart in extended position.

FIG. 7 is a rear plan view of the folding golf cart in extended position, and FIG. 8 is a front plan view of the folding golf cart 10 in extended position. Referring now to both FIGS. 7 and 8, the front wheel 16, left rear wheel 18, right rear wheel 20, lower bag support 28, lower bag wrap 30 and upper bag wrap 32 can be seen. The left wheel fitting 48, right wheel fitting 50, middle fitting 56, left wheel strut 52 and right wheel strut 54, as well as upper frame pivot 42, upper support mount 58, and link rods 60 are also seen, as well as the wheel fitting pivots 66. An upper locking knob 70 and a lower locking knob 72 when engaged, prevents the handle 22 and the front wheel 16 respectively from rotating. An accessories tray 74 is seen included in the handle 22.

Figure 9:
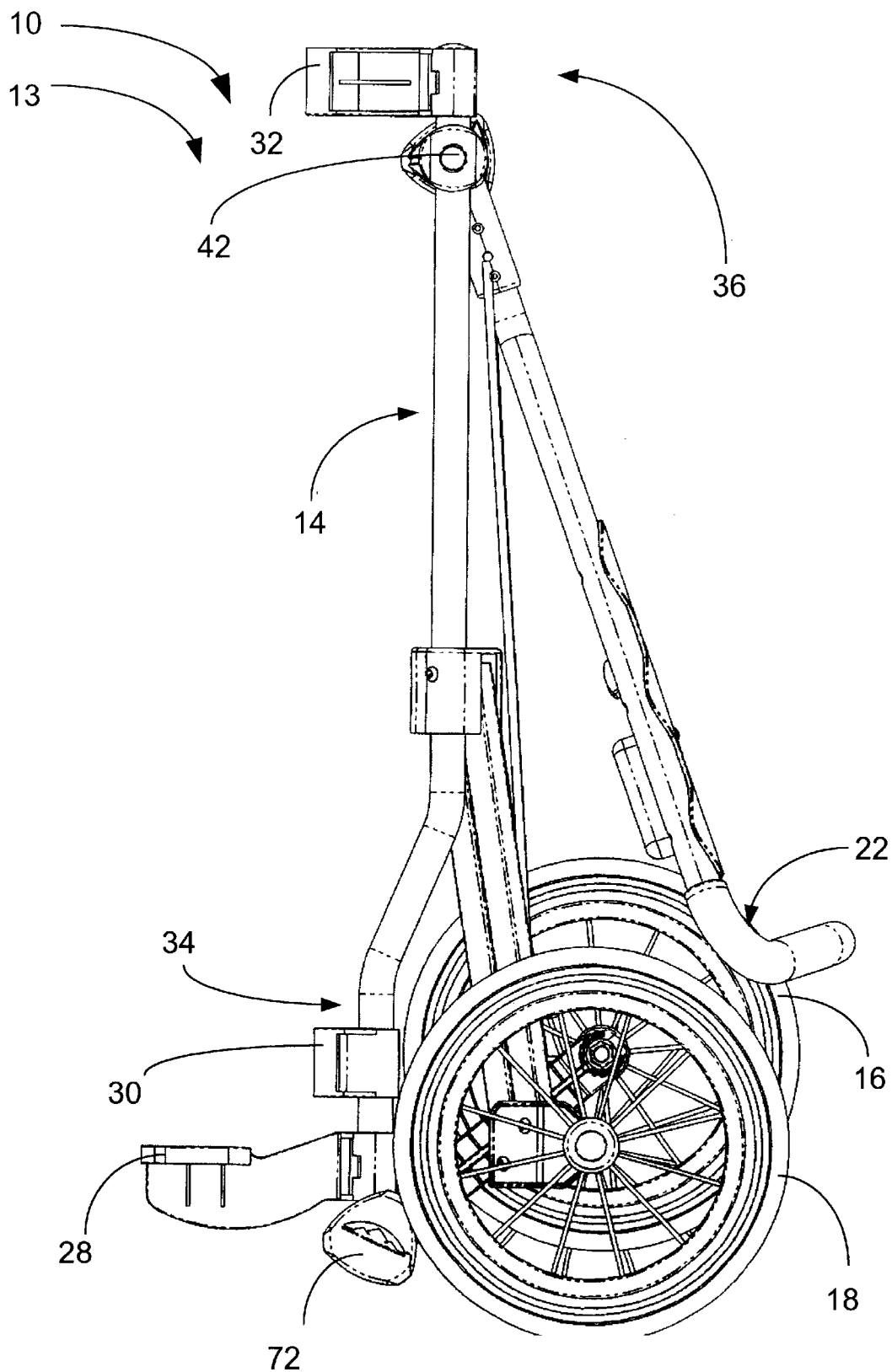
FIG. 9 illustrates a side plan view of the folding golf cart in retracted position.
Figure 10:
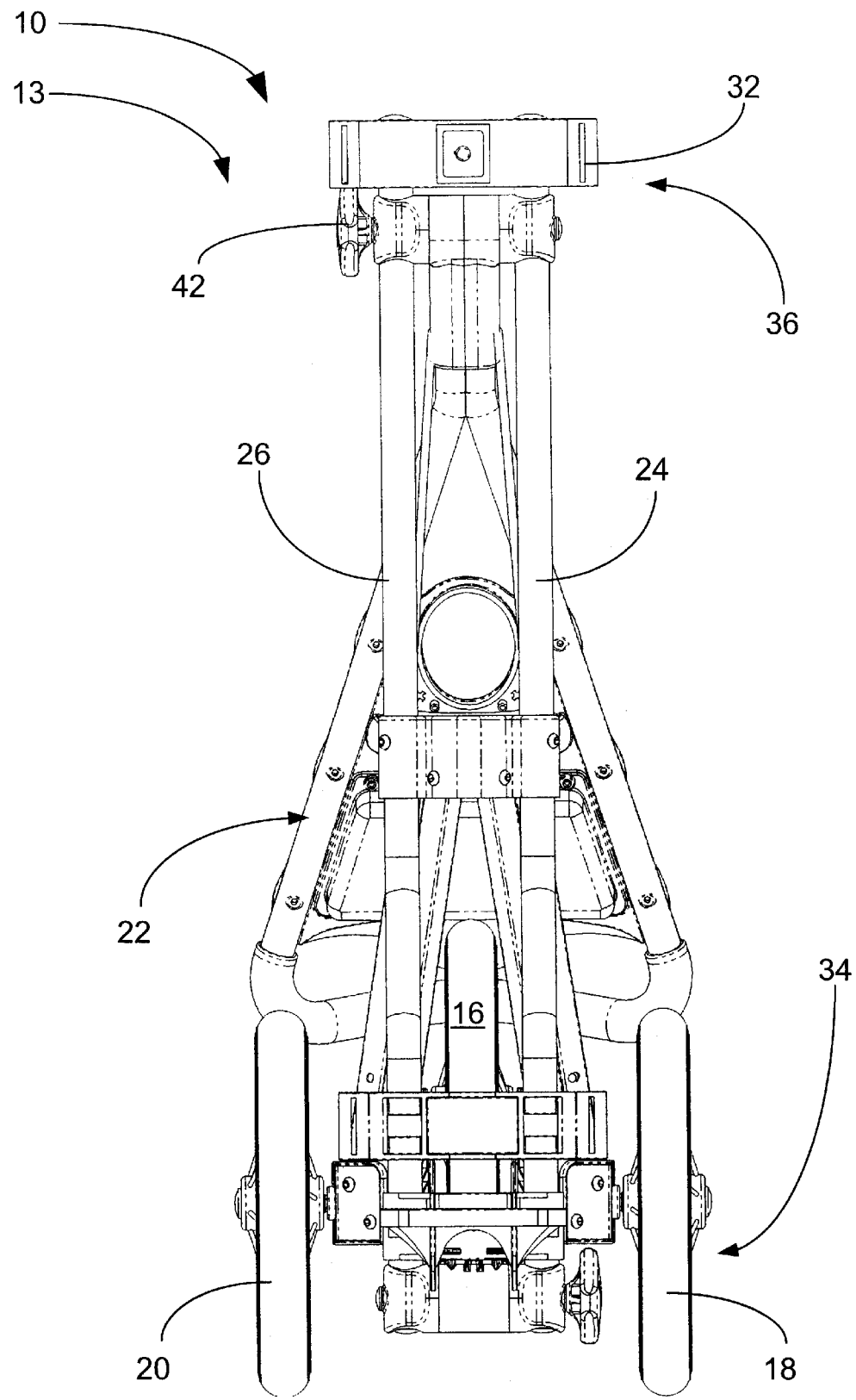
FIG. 10 shows a front plan view of the folding golf cart in retracted position.
Figure 11:
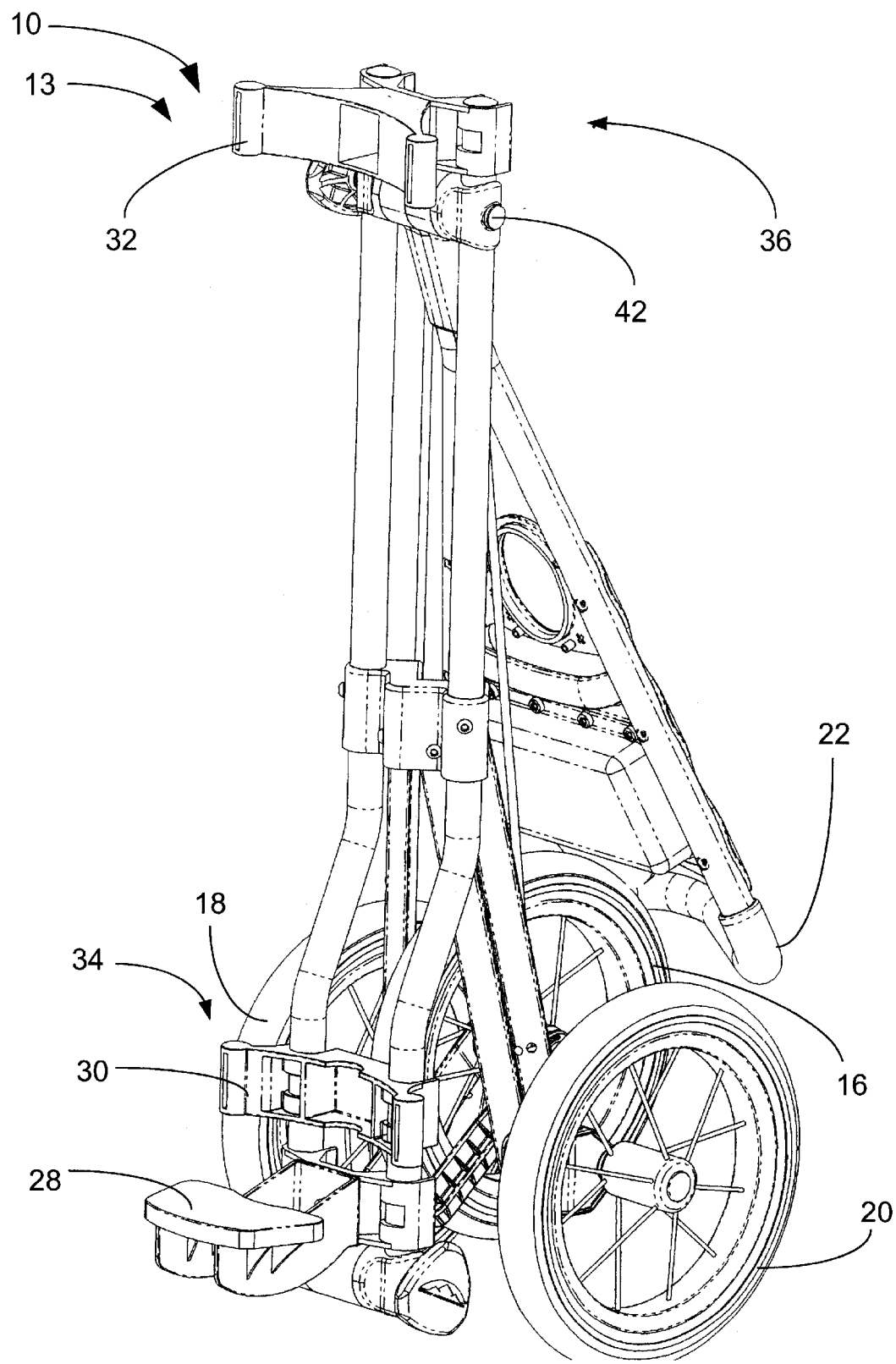
FIG. 11 shows a front perspective view of the folding golf cart in retracted position.

FIGS. 9–11 also show the folding cart 10 in its retracted position 13. The front wheel 16 is shown in position between the left rear wheel 18 and the right rear wheel 20, as well as the handle 22, left frame member 24 and right frame member 26, lower bag support 28, lower and upper bag wraps 30, 32, lower and upper ends of the frame 34, 36, and upper frame pivot 42. The collapsed cart is still preferably free-standing by resting on its rear wheels 18, 20 and with the lower locking knob 72 contacting the ground to provide a third support foot.

Figure 12:
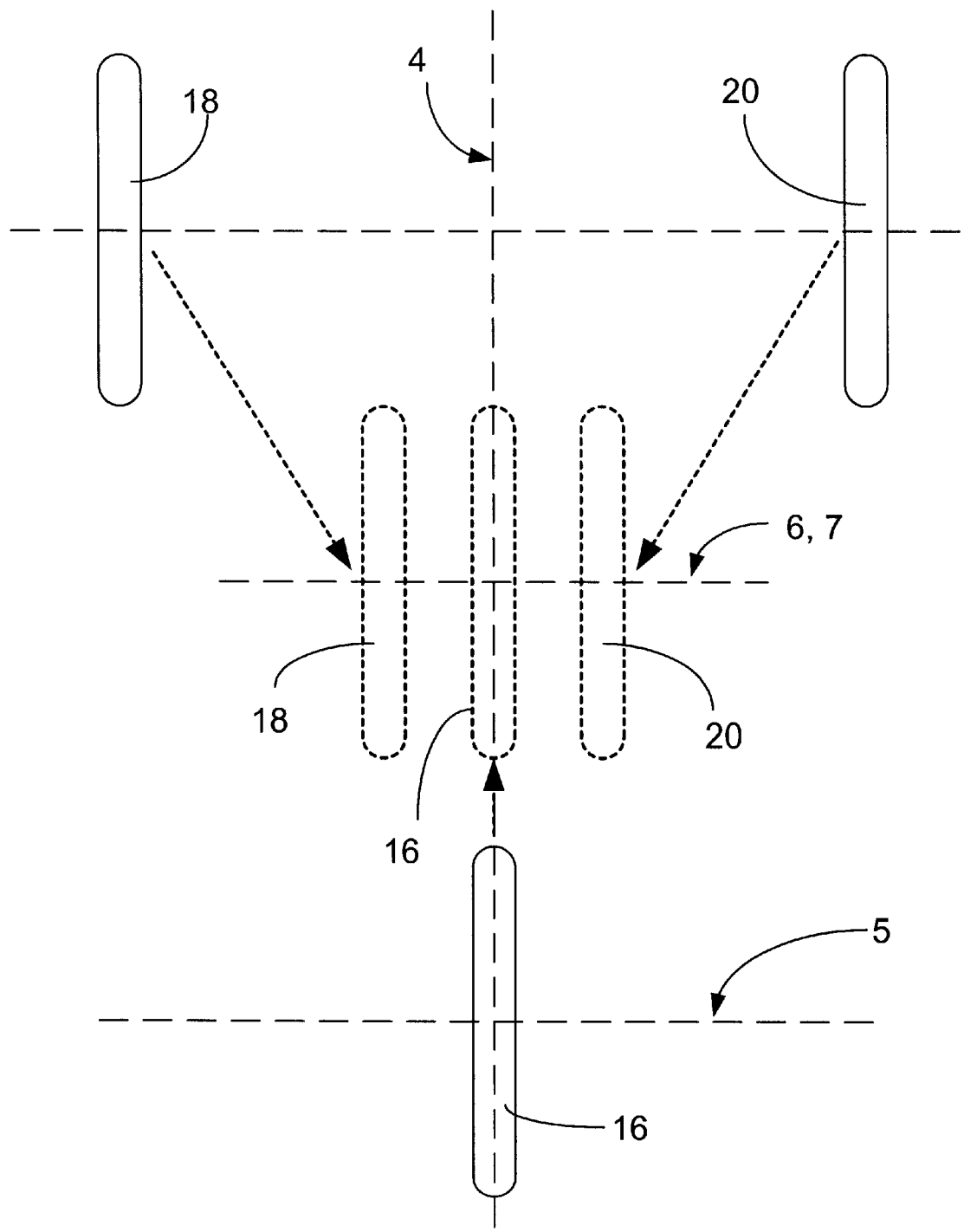
FIG. 12 illustrates a top view moving body diagram of the wheels as they move from an extended to a collapsed configuration.

FIG. 12 is a top view of the front wheel 16 and rear wheels 18, 20 as they move from an extended position 12, shown with solid outlines, to a retracted position 13, shown in dashed outlines. A longitudinal axis 4 is shown about which the wheels 16, 18, 20 are generally arranged symmetrically, although this is not a requirement. An extended position wheel axis 6 is shown extending through the front wheel 16 when it is in extended position 12, as well as a retracted position wheel axis 6 when the wheels are in the retracted position 13. The retracted position wheel axis 6 may be considered to be a common axis 7 towards which the rear wheels 18, 20 and front wheel 16 travel, although it is not necessary that the three wheels 16, 18, 20 achieve alignment with this common axis 7. The rear wheels 18, 20 are shown to be substantially aligned with the retracted position wheel axis 6, so that the common axis 7 is truly common to all three wheels 16, 18, 20, but this substantial alignment is not to be construed as a limitation. Rather, the rear wheels 18, 20 preferably move towards the longitudinal axis 4 and in the direction of the front wheel's retracted position wheel axis 6. This movement may be in unison, or may be an independent movement by each wheel 18, 20 separately. Also it is possible that the front wheel 16 move alone to pivot to it retracted position while the rear wheel 18, 20 remain extended, and these rear wheels may actually not be movable at all, although this is less preferred.

Figure 13:
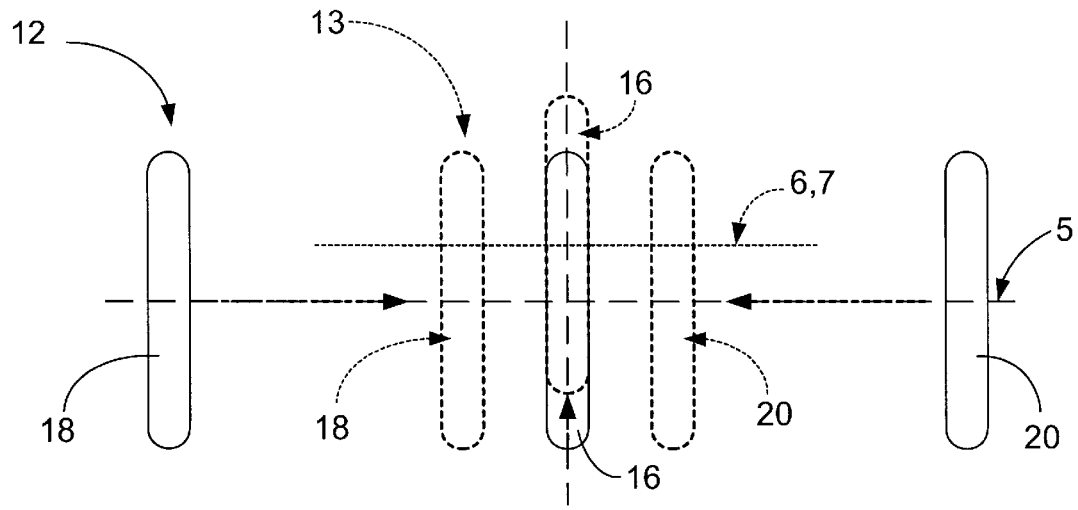
FIG. 13 shows a front view moving body diagram of the wheels as they move from an extended to a collapsed configuration.

FIG. 13 is a front view of the wheels as they move from an extended position 12 to a retracted position 13. As seen in FIG. 11, the rear wheel 16, when retracted, is slightly higher with respect to the ground than the two rear wheels 18, 20. This is shown in FIG. 13 as the retracted position wheel axis 6, which is above the extended position wheel axis 6, with the wheels in retracted position again shown in dashed lines. This is again not a necessity, and should not be construed as a limitation, as the wheels may be again substantially aligned or the front wheel 16 raised slightly but to a greater or lesser degree than shown here. The front wheel 16 may even be lower vertically than the rear wheels 18, 20, however, this may present problems of stability if the retracted cart is to stand up, and is less preferred, but still possible.

Figure 14:
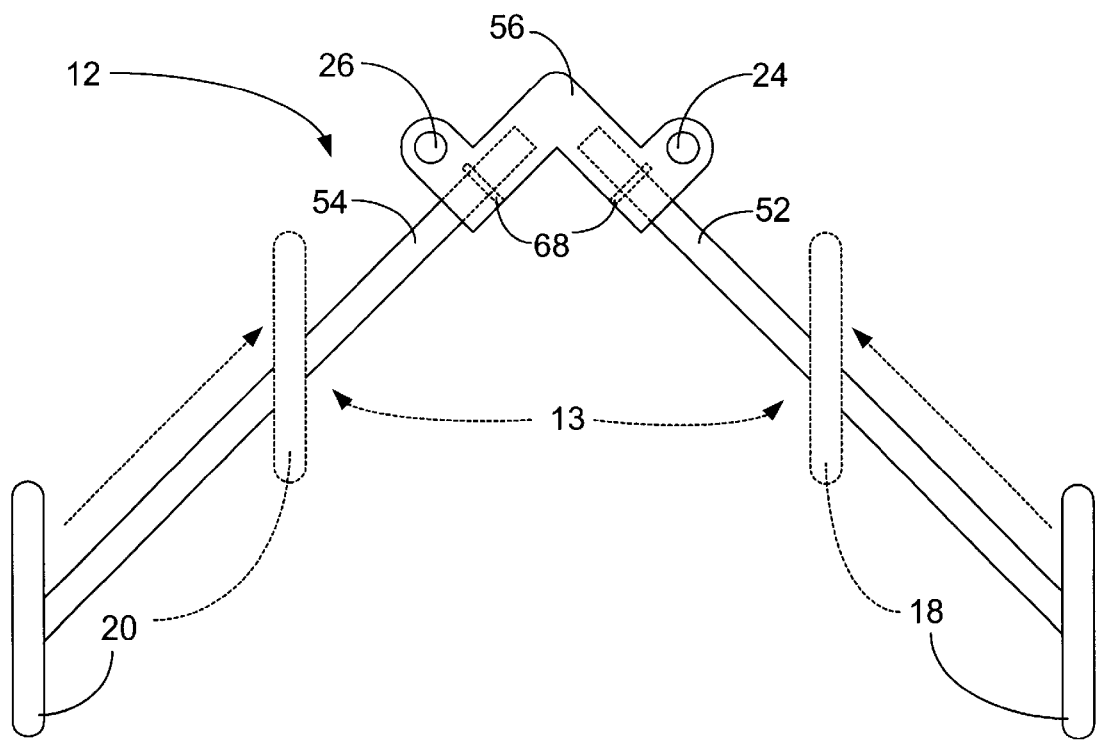
FIG. 14 illustrates a cut away view of the frame and struts as seen from view arrows 14—14 in FIG. 4.

FIG. 14 shows a detail view of the frame and struts as seen from cross section 14—14 in FIG. 4. Middle fitting 56 is shown fixedly attached to left frame member 24 and right frame member 26. Left wheel strut 52 connects the left rear wheel 18, and the right wheel strut 54 connects the right rear wheel 20, left and right being reversed here due to the point of view taken. The left and right struts 52, 54 are attached to the middle fitting 56 by mid-frame pivots 68. These pivots allow motion of the struts 52, 54 only in planes which are at right angles to each other, so that as the wheels are moved from extended to retracted positions, in this view, the length of the struts appears to shorten, and the wheels move closer together while moving along the line of the struts 52, 54 as shown by the arrows.

Figure 15:
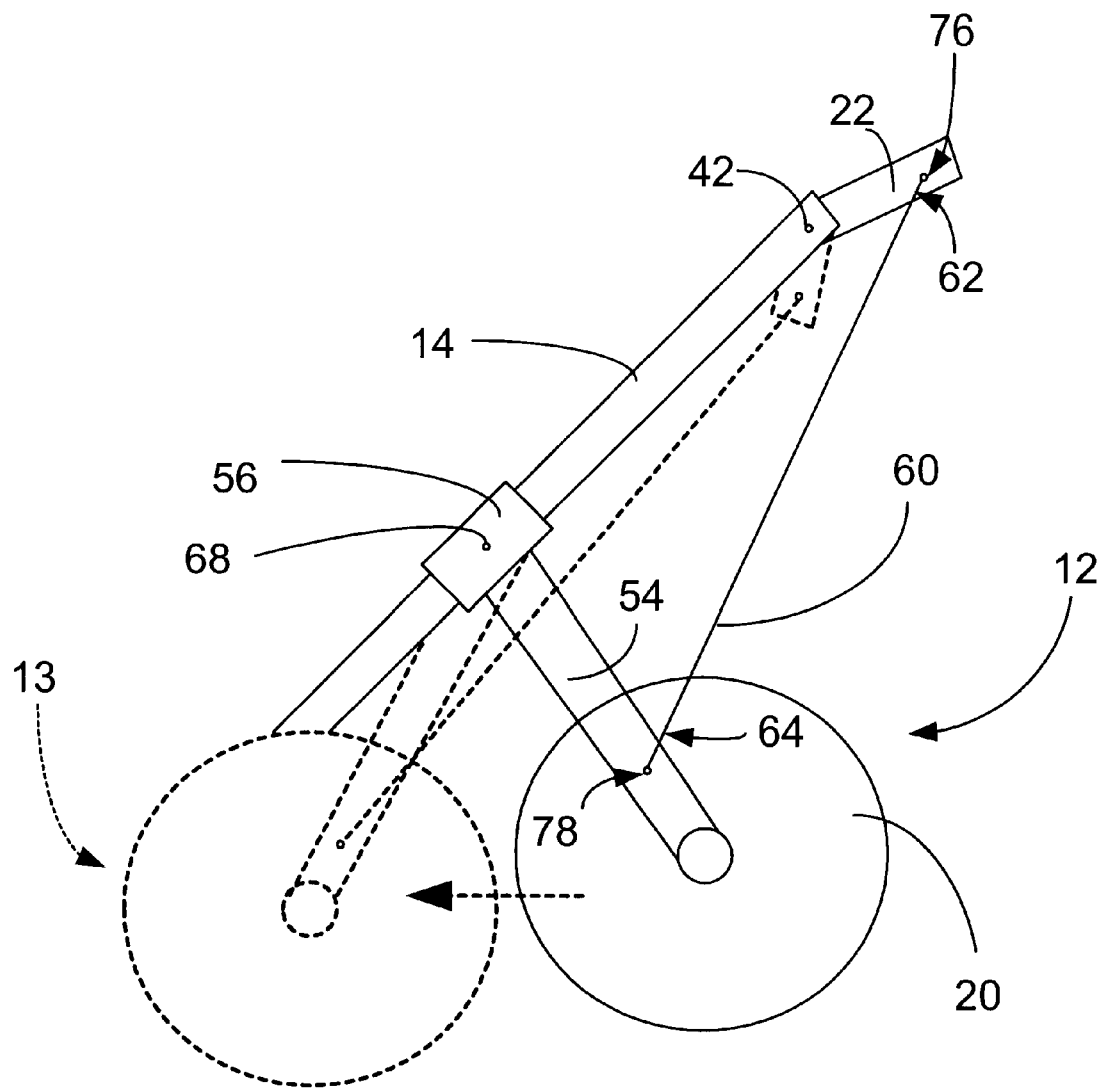
FIG. 15 shows a side view moving body diagram showing the motion of the rear wheels as they move from an extended to a collapsed configuration.

FIG. 15 shows a moving body diagram of the right rear wheel 20 as it moves from extended 12 to retracted position 13. The frame 14 is seen with middle fitting 56, containing mid frame pivot 68. The upper end 36 of the frame 14 is pivotally attached to the handle 22. This handle 22 includes an upper link rod pivot 76 to which the upper end 62 of a link rod 60 is pivotally attached. Only the portion of the handle 22 containing the link rod pivot 76 is shown for easier viewing. The link rod lower end 64 is also pivotally attached at a lower link rod pivot 78 to the right wheel strut 54. The link rod 60 is rigid or semi-rigid, so when the handle 22 is rotated about the upper frame pivot 42, the upper end 62 of the link rod 60 pivots in upper link rod pivot 76, and the lower end 64 of the link rod 60 pushes on the right wheel strut 54. The right wheel strut 54 pivots at the mid frame pivot 68, thus pushing the right wheel 20 in the direction of the arrow, into the retracted configuration 13.

The handle 22 is preferably fitted with an upper link rod pivot 76 on the other side symmetrically arranged, so that both wheels are retracted together, but this is not a necessity, and should not be construed as a limitation.

Figure 16:
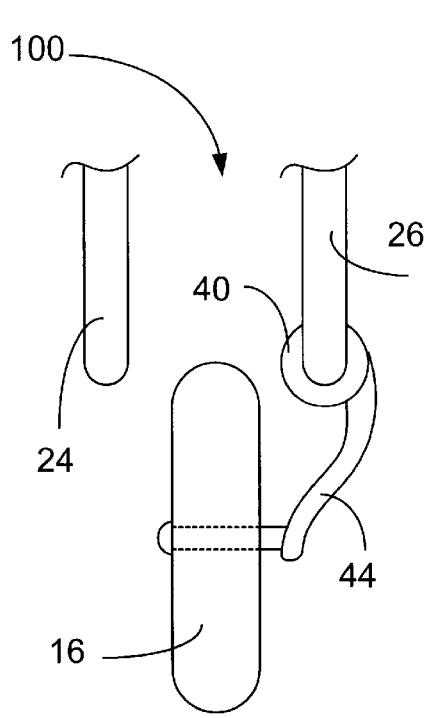
FIG. 16 shows a top plan detail view of the front wheel and lower frame pivot of an alternate embodiment of the present invention.
Figure 17:
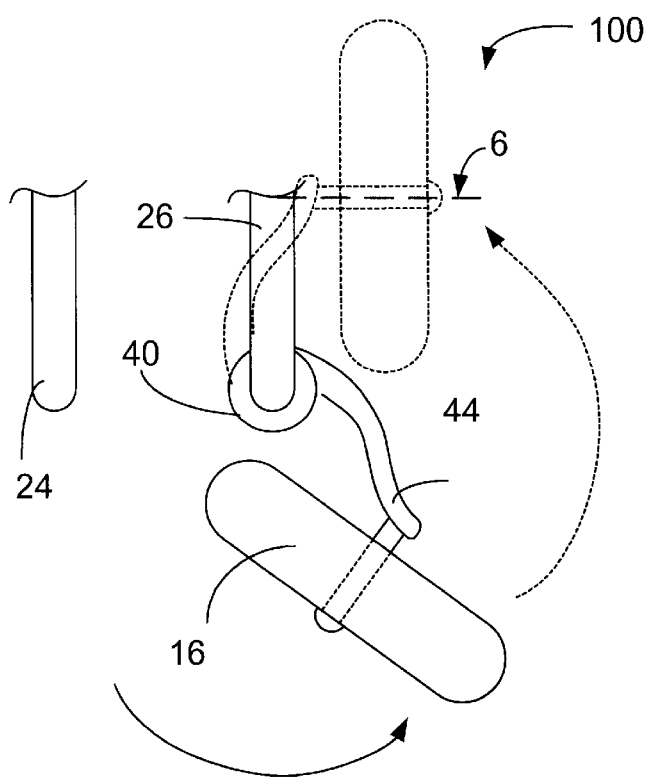
FIG. 17 shows a top plan detail view of the front wheel and lower frame pivot of an alternate embodiment of the present invention.
Figure 18:
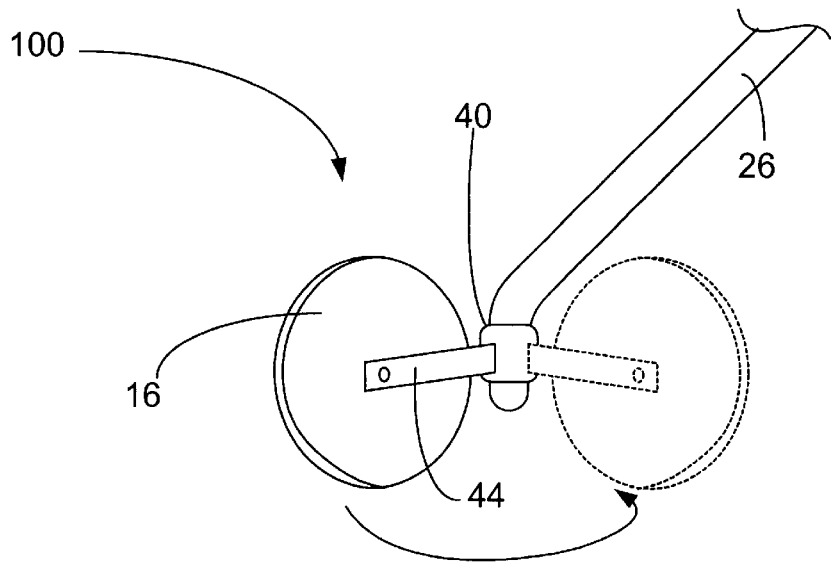
FIG. 18 shows a side isometric detail view of the front wheel and lower frame pivot of an alternate embodiment of the present invention.

FIGS. 16–18 illustrate a detail of an alternate embodiment of the collapsible golf cart 100. Where elements are similar to those in the previous embodiment, the same element numbers shall be used. In this embodiment, the front wheel 16 rotates in a lateral direction, that is, in an arc as seen from a top plan view as in FIGS. 16 and 17, an arc whose center of rotation is the lower frame pivot 40, which is positioned near the lower end 34 of one of the two frame members 24, 26. Preferably, the front wheel mount 44 and the front wheel 16 pivot so that the front wheel 16 comes to rest near or between the two rear wheels 18, 20, when they have been collapsed also, to form a similar compact configuration, as seen in FIGS. 9–11. As before, there is preferably a locking mechanism (not shown), which maintains the front wheel 16 in position in either the expanded or collapsed position.

FIG. 18 shows another simplified detail view of the front wheel 16 as it pivots about the lower frame pivot 40, located on one of the frame members 26. This mode of movement from extended to collapsed position by traveling in an arc shall be termed lateral movement, as opposed to the vertical mode of movement shown in FIG. 4. The rear wheels 18, 20 continue to move towards a retracted wheel axis 6 (see also FIG. 12), as in the earlier variation, and preferably end substantially aligned with it, or near it.

While various embodiments have been described above, it should be understood that they have been presented by way of example only, and not limitation.

INDUSTRIAL APPLICABILITY

The present collapsible golf cart 10 is well suited carrying a user's golf bag over rough terrain, and on a wide variety of landscapes. It has an exceptional wide and long wheel base, and has very good stability on slopes and grades. Such a large wheel base would perhaps be impractical if the cart 10 was not designed to collapse into such a compact configuration 13, when not in use. This ability to compact easily allows users to conveniently pack it for transport or storage, and makes it practical for the average golfer.

Movement to this collapsed configuration 13 from its extended configuration 12 is preferably achieved by unlocking the upper locking knob 70, and rotating the handle 22 towards the ground. The upper end 36 of the frame 14 is pivotally attached to the handle 22. This handle 22 includes an upper link rod pivot 76 to which the upper end 62 of a link rod 60 is pivotally attached. The link rod lower end 64 is also pivotally attached at a lower link rod pivot 78 to the right wheel strut 54. The link rod 60 is rigid or semi-rigid, so when the handle 22 is rotated about the upper frame pivot 42, the upper end 62 of the link rod 60 pivots in upper link rod pivot 76, and the lower end 64 of the link rod 60 pushes on the right wheel strut 54. The right wheel strut 54 pivots at the mid frame pivot 68, thus pushing the right wheel 20 into the retracted configuration 13. The lower locking knob 72 can then be unlocked to allow the front wheel and the front wheel mount 44 to pivot about the lower frame pivot to tuck back between the rear wheels 18, 20 in their collapsed position.

The frame 14 is preferably made of left and right frame members 24, 26. Middle fitting 56 is preferably fixedly attached to left frame member 24 and right frame member 26. Left wheel strut 52 connects the left rear wheel 18, and the right wheel strut 54 connects the right rear wheel 20, and the left and right struts 52,54 are attached to the middle fitting 56 by mid-frame pivots 68. These pivots allow motion of the struts 52, 54 only in planes which are at right angles to each other, so that as the wheels 18, 20 are moved from extended 12 to retracted positions 13, the wheels move closer together at the same time that they are moving toward the front wheel 16.

Thus the large wheel base collapses conveniently to a much smaller configuration for easy storage and transportation.

It is of course not necessary for the collapsing of the rear wheel 18, 20 to be done first, and the front wheel 14 may be pivoted into its collapsed position first, if desired.

For the above, and other, reasons, it is expected that the screw extruder 10 of the present invention will have widespread industrial applicability. Therefore, it is expected that the commercial utility of the present invention will be extensive and long lasting.

What is claimed is:

1. A golf bag push cart comprising:
   a frame having an upper end and a lower end;
   a handle attached to said upper end of said frame, said handle being pivotally attached to said frame at an upper frame pivot, so that said handle pivots about said upper frame pivot from an extended position to a collapsed position;
   a front wheel attached to said lower end of said frame;
   first and second rear wheels;
   first and second wheel struts, to which said first and second rear wheels are rotatably mounted,
   said first and second wheel struts being pivotally mounted to said frame by mid-frame pivots, said wheel struts being coupled together;
   at least one link rod connecting a portion of said handle to a portion of at least one of said wheel struts, so that as said handle pivots, said link rod is pushed, and said at least one wheel strut is urged to pivot such that said rear wheels move in unison towards each other as well as towards said front wheel, as the golf bag push cart is being collapsed; and
   a front wheel mount to which said front wheel is rotatably mounted, said front wheel mount being pivotally attached to said frame by a lower frame pivot, and said front wheel and said wheel mount pivot about said lower frame pivot so that said front wheel moves towards said rear wheels, when said golf bag push cart is being collapsed.

2. The golf bag push cart of claim 1, wherein:
   said at least one link rod is a pair of link rods connecting a portion of said handle to a portion of each of said wheel struts.

3. The golf bag push cart of claim 1, wherein:
   said rear wheel and said front wheel are substantially aligned, when said golf bag cart is in collapsed configuration.

4. The golf bag push cart of claim 1, further comprising:
   at least one locking means which prevents said handle from rotation about said upper frame pivot when engaged.

5. The golf bag push cart of claim 1, further comprising:
   at least one locking means which prevents said front wheel mount from rotation about said lower frame pivot when engaged.

6. The golf bag push cart of claim 1, wherein:
   said frame comprises first and second frame members.

7. The golf bag push cart of claim 1, wherein:
   said mid-frame pivots are positioned in a substantially right angle bracket, such that movement of each of said struts is limited to a plane which is at substantially right angles to the plane of the other strut.

8. The golf bag push cart of claim 1, wherein:
   said front wheel pivots laterally about said lower frame pivot, as the golf bag push cart moves from an extended configuration to a collapsed configuration.

9. The golf bag push cart of claim 1, wherein:
   said front wheel pivots vertically about said lower frame pivot, as the golf bag push cart moves from an extended configuration to a collapsed configuration.

10. A golf bag cart which is movable from a extended configuration to a collapsed configuration, comprising:
    a frame;
    a front wheel;
    first and second rear wheels, which are pivotally mounted to said frame by mid-frame pivots, and which are coupled together such that said rear wheels move in unison towards each other as well as towards said front wheel, as the golf bag is being collapsed;

a front wheel mount to which said front wheel is rotatably mounted, said front wheel mount being pivotally attached to said frame by a lower frame pivot, and said front wheel and said wheel mount pivot about said lower frame pivot so that said front wheel moves towards said rear wheels, such that said rear wheel and said front wheel are substantially aligned, when said golf bag cart is in collapsed configuration.

first and second wheel struts, to which said first and second rear wheels are rotatably mounted, the first and second wheel struts being pivotally mounted to said frame by mid-frame pivots; and at least one link rod connecting a portion of said handle to a portion of at least one of said wheel struts.

11. The golf bag cart of claim 10, further comprising:

a handle which is pivotally attached to said frame at an upper frame pivot, so that said handle pivots about said upper frame pivot from an extended position to a collapsed position.

12. The golf bag cart of claim 11, wherein:

said at least one link rod is at least semi-rigid, so that when said handle pivots about said upper frame pivot, said link rod is pushed, and said at least one wheel strut is urged to pivot.

13. The golf bag cart of claim 10, wherein:

said golf bag cart is a push cart.

14. A golf bag push cart which is movable from a extended configuration to a collapsed configuration, comprising:

a frame;

first and second rear wheels;

first and second wheel struts, to which said first and second rear wheels are rotatably mounted, the first and second wheel struts being pivotally mounted to said frame by mid-frame pivots;

a front wheel and a front wheel mount to which said front wheel is rotatably mounted, said front wheel mount being pivotally attached to said frame by a lower frame pivot, a handle which is pivotally attached to said frame at an upper frame pivot, so that said handle pivots about said upper frame pivot from an extended position to a collapsed position; and at least one link rod which is at least semi-rigid, connecting a portion of said handle to a portion of at least one of said wheel struts so that when said handle pivots about said upper frame pivot, said link rod is pushed, and said at least one wheel strut is urged to pivot such that said rear wheels pivot about said mid-frame pivots to move towards each other and also move towards said front wheel, and said front wheel and said wheel mount pivot about said lower frame pivot so that said front wheel moves towards said rear wheels, when said golf bag cart is being collapsed.

15. The golf bag push cart of claim 14, wherein:

said front wheel pivots laterally about said lower frame pivot, as it moves from an extended configuration to a collapsed configuration.

16. The golf bag push cart of claim 14, wherein:

said front wheel pivots vertically about said lower frame pivot, as it moves from an extended configuration to a collapsed configuration.

17. A golf bag push cart comprising:

a frame having a lower end;

a handle which is pivotally attached to said frame at an upper frame pivot, so that said handle pivots about said upper frame pivot from an extended position to a collapsed position.

a front wheel;

first and second rear wheels;

first and second wheel struts, to which said first and second rear wheels are rotatably mounted, the first and second wheel struts being pivotally mounted to said frame;

linking means connecting a portion of said handle to a portion of each of said wheel struts, said wheel struts being thus coupled together such that said rear wheels move in unison in response to pivotal motion by said handle when said golf bag cart is moved from a extended configuration to a collapsed configuration; and a front wheel mount to which said front wheel is rotatably mounted, said front wheel mount being pivotally attached to said frame by a lower frame pivot, and said front wheel and said wheel mount pivot about said lower frame pivot so that said front wheel moves towards said rear wheels, when said golf bag push cart is being collapsed.

18. A golf bag push cart comprising:

a frame having an upper end and a lower end, said frame comprises first and second frame members;

a handle attached to said upper end of said frame, said handle being pivotally attached to said frame at an upper frame pivot, so that said handle pivots about said upper frame pivot from an extended position to a collapsed position;

a front wheel attached to said lower end of said frame;

first and second rear wheels;

first and second wheel struts, to which said first and second rear wheels are rotatably mounted, said first and second wheel struts being pivotally mounted to said frame by mid-frame pivots, said wheel struts being coupled together;

such that said rear wheels move in unison towards each other as well as towards said front wheel, as the golf bag push cart is being collapsed;

a front wheel mount to which said front wheel is rotatably mounted, said front wheel mount being pivotally attached to said frame by a lower frame pivot, and said front wheel and said wheel mount pivot about said lower frame pivot so that said front wheel moves towards said rear wheels, when said golf bag push cart is being collapsed; and at least one link rod connecting a portion of said handle to a portion of at least one of said wheel struts, said at least one link rod is at least semi-rigid, so that when said handle pivots about said upper frame pivot, said link rod is pushed, and said at least one wheel strut is urged to pivot.

* * * * *